US006666594B2

(12) United States Patent
Parry

(10) Patent No.: US 6,666,594 B2
(45) Date of Patent: Dec. 23, 2003

(54) METHOD AND SYSTEM FOR WEB BASED PRINTER ERROR INFORMATION

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 10/085,789

(22) Filed: Oct. 19, 2001

(65) Prior Publication Data

US 2003/0077097 A1 Apr. 24, 2003

(51) Int. Cl.[7] .................................................. B41J 11/44
(52) U.S. Cl. ............................. 400/74; 400/70; 400/76; 400/61; 101/484
(58) Field of Search .............................. 400/74, 76, 70, 400/61; 101/484

(56) References Cited

U.S. PATENT DOCUMENTS

| 5,027,154 | A | | 6/1991 | Ujiie et al. |
| 5,620,264 | A | | 4/1997 | Kagita |
| 5,625,757 | A | | 4/1997 | Kageyama et al. |
| 6,185,379 | B1 | | 2/2001 | Lay et al. |
| 6,240,456 | B1 | * | 5/2001 | Teng et al. ................. 709/230 |
| 6,400,462 | B1 | * | 6/2002 | Hille ......................... 358/1.14 |
| 6,487,684 | B1 | * | 11/2002 | Ishii ............................ 714/44 |

* cited by examiner

Primary Examiner—Charles H. Nolan, Jr.

(57) ABSTRACT

Methods and apparatus for providing information on printer errors, in response to specific printer errors. In one embodiment, a printer contains an error detecting device and a memory. If printer errors are detected, error messages are generated. The user may view the error messages, each error message contains basic information on the type of error that occurred, and a "link" to obtain further information. By activating the link, the user can download information on that error from a remote computer over World Wide Web (Internet) or other network. Information on printer errors is maintained and updated in a memory of the remote computer. The system thus provides the most current information related to each printer error.

23 Claims, 3 Drawing Sheets

METHOD AND SYSTEM FOR WEB BASED PRINTER ERROR INFORMATION

FIELD OF THE INVENTION

The present invention relates generally to printers and methods of reporting and correcting printer errors. More specifically, the present invention relates to providing current information on printer errors to allow those errors to be corrected or their future occurrence to be reduced.

BACKGROUND OF THE INVENTION

Printers are well-known computer peripherals widely used in both home and business computing environments. Printer technology has made rapid advances over recent years. State of the art printers offer ever-increasing levels of speed, print quality, easily manipulated format options, and a wide variety of features, such as document collating, stapling, and various levels of print quality. Printers using Inkjet or laser technology are capable of reproducing almost any image. As printer technology advances, the process of printing a document from a computer workstation involves ever increasing numbers of steps. Errors can occur at any of these steps. It has become common practice to keep an "error log" in the printer memory, to track printing errors and technical problems. The repair of inoperable or damaged printers can be aided by examining the error log for patterns of errors occurring prior to breakage. Typically, the error log provides only basic information on a print error; such as whether the error involved software, hardware, a lack of memory, or a physical problem such as a paper jam.

As it is used herein, the term "printer" signifies any device capable of providing printer function alone or, alternatively, any device providing printer function in combination with one or more other document processing functions, such as, for example, copying, scanning, or facsimile capabilities.

Printer manufacturers provide technical support for printing devices, including software, hardware, and firmware upgrades to resolve problems that users have encountered with printers. Instructions on settings and usages that may reduce errors are similarly provided. Unfortunately, many printers are either under utilized or inefficiently utilized as users do not understand, or are not informed, of this information, which can allow for more trouble free printer usage. A user must be aware of both the availability of such an item, and that printer errors are of the type that would benefit from an upgrade, component replacement, settings change, or other information. Learning this information has traditionally required a user to research the manufacturer's website and/or printed materials for information and to examine all available printer related upgrades and then check their details for desired characteristics. Monitoring printer error patterns requires users to keep track of all printer errors, which may be impracticable for some networked printers, or to examine and understand the printer error log. These activities may be beyond the abilities or merely beyond the "comfort level" of a casual computer user.

Printers are known in the art that provide instructions to the user on correcting simple physical problems, such as replacing an empty toner bottle or clearing a paper jam. U.S. Pat. No. 6,185,379, issued Feb. 6, 2001 to Lay et al., and U.S. Pat. No. 5,027,154 issued Jun. 25, 1991 to Ujiie et al. describe such printers, and are incorporated herein by reference. However, for more complex physical problems or other errors, these systems merely advise the user to contact a repair service. These printers thus fail to provide information on actions that may be taken to prevent or reduce the recurrence of error. Such actions may include the installation of upgrades to the software, hardware, or firmware associated with the printer; switching printer supplies to alternative inks or different paper, or making changes in document format, among other possibilities. A system or method that provides this information, especially one allowing the information to be continually updated would constitute a substantial improvement in the art.

SUMMARY OF THE INVENTION

The present invention provides methods and apparatus for providing information on printer errors, in response to specific printer errors. In one embodiment, a printer contains an error detecting device and a memory. If printer errors are detected, error messages are generated. The user may view the error messages, each error message contains basic information on the type of error that occurred, and a "link" to obtain further information. By activating the link, the user can download information on that error from a remote computer over World Wide Web (Internet) or other network. information on printer errors is maintained and updated in a memory of the remote computer. The system thus provides the most current information related to each printer error. Methods of the present invention include providing a printer incorporating an error detector, linked to a network. The error detector monitors print jobs sent to the printer, generating an error message when an error is detected. Selection of the error messages makes information available on that printer error through the network from a remote computer where such information is maintained.

DETAILED DESCRIPTION OF THE INVENTION

Figure 1:
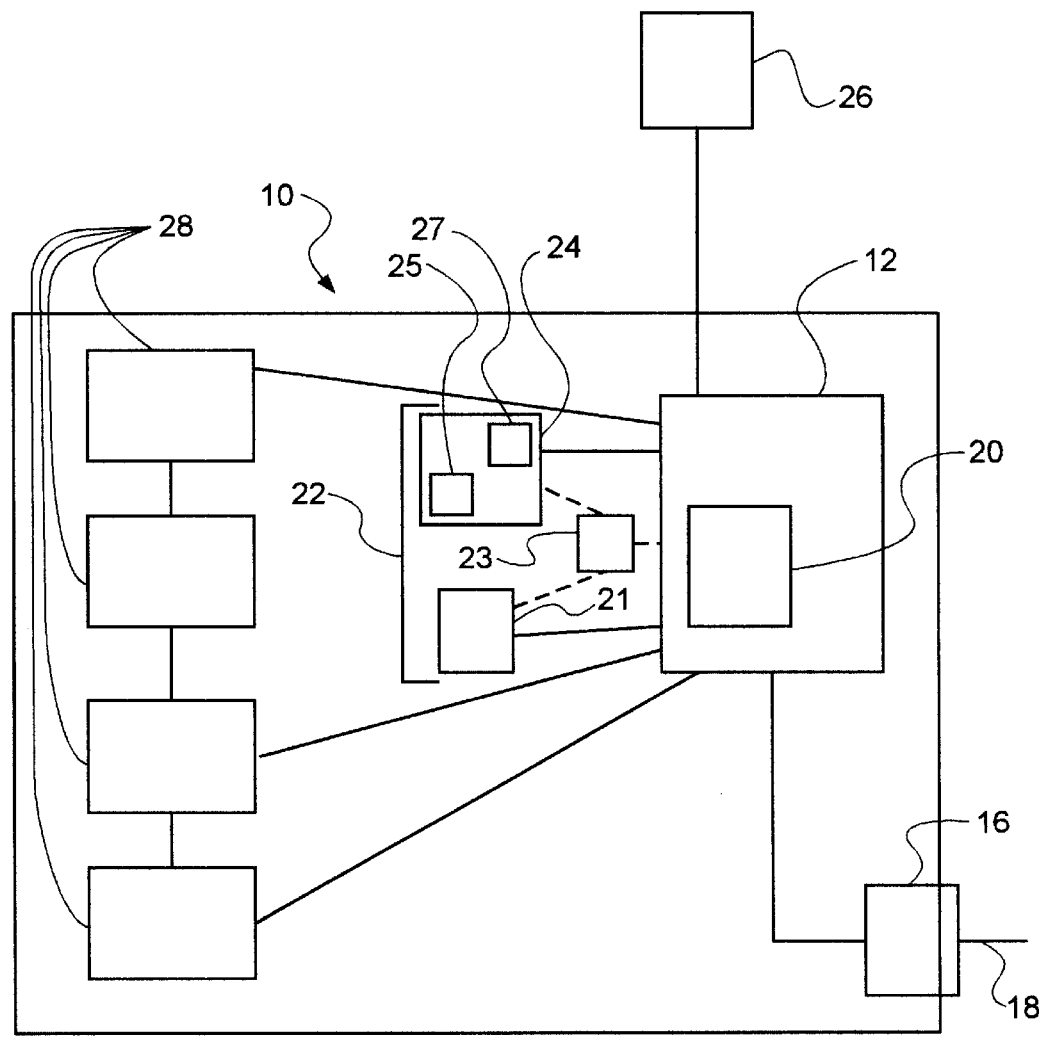
FIG. 1 is a block diagram of a printing device configured with an embedded Web server for use in the methods and system of the present invention.

The present invention provides methods and apparatus for providing information on specific printer errors in response to those errors. In one possible preferred embodiment, the present invention makes use of a printer with an error detector and an internal error archive stored in a memory thereon to carry out the methods described herein.

It will be appreciated by those skilled in the art that the embodiments herein described while illustrating certain embodiments are not intended to so limit the invention or the scope of the appended claims. Those skilled in the art will also understand that various combinations or modifications of the preferred embodiments could be made without departing from the scope of the invention.

In a typical printing process over a network environment, a user at a computer workstation typically uses print driver software to load documents or images into a buffer (usually an area on a disk of a workstation), where a printer pulls them off the buffer at its own rate. The print driver functions to convert the text, graphics and print attributes specified by the user's workstation into a set of codes that the printer can translate and/or read. The set of codes is typically a version of Printer Control Language (PCL), developed by Hewlett-Packard for its dot-matrix, inkjet, and LaserJet series printers. The version of PCL most commonly used as the printer coding language is Page Description Language (PDL). Once the text, graphics and print attributes have been converted to PDL, the PDL is transmitted by the workstation over the network where it is received by the printer as a "print job." Examples of PDL's include Hewlett Packard's HP-GL/2 language and Adobe's PostScript.

As the printer receives the coded language from the print driver, it stores the information in high capacity memory storage (job retention), which typically comprises random-access memory (RAM) or a hard disk. A stored print job thus comprises one or more electronically stored files and the print attributes associated therewith. Before a typical print job (e.g., a PDL file) can be printed, however, its contents must be converted to a bit-mapped image format, also known as a raster image. The raster image is a bit-mapped representation of the document to be printed, with each bit in the bitmap representing the absence or presence of a dot (or pixel) on the printed page. A raster image processor ("RIP") in the printer typically translates PDL files to a raster image, also called a "RIP'ed" version of the file. Thus, the print files include data representing graphical images and the RIP'ed version is generated from the print file. Typically, print jobs are RIP'ed before storage in job retention, making them "print ready files." In some cases, print jobs are received by the printer in the form of raster image data. In that case, a processor in the printer may engage in pixel image manipulation when storing the print job. The printer then uses the data in the print ready file to control the mechanical printing components and the printing steps, such as paper feeding, controlling the inkjets of an inkjet printer or the laser scanning assembly and revolving drum and other associated mechanisms of a laser printer. Errors can be introduced into the process at any of the above steps.

Referring to FIG. 1, one possible embodiment of a preferred printer 10 for carrying out the methods of the present invention is shown. Printer 10 is configured with both printer specific hardware and software and optionally may include an embedded Web interfacing system (e.g., a Web server 12) for enabling access and interaction with other devices linked to local and external communication networks ("networks"), including the World Wide Web (the Internet"), a local area network (LAN), a wide area network (WAN), an intranet, the computer network of an online service, etc. The printer specific hardware and software of printer 10 may be provided in any conventional printer configuration known in the art, including those associated with laser printers, impact printers, photographic printers, and inkjet printers. Printer 10 optionally may include one or more local displays 26, which may comprise a conventional monitor, a monitor coupled with an integrated display, an integrated display (e.g., an LCD display), or other means for viewing print queues, print attributes, and associated data or processing information, including printer specific information. Printer 10 also includes a network interface (I/O) 16 for bidirectional data communication through one or more and preferably all of the various networks (LAN, WAN, Internet, etc.) using communication paths or links known in the art, including wireless connections, Ethernet, bus line, Fibre Channel, ATM, standard serial connections, and the like.

In embodiments where included, the embedded Web interfacing system comprises a Web server 12 providing one or more Web server functions to requesting users linked by way of one or more of the various networks (LAN, WAN, Internet, etc.). The preferred printer 10 of the present invention may thus be the same or conceptually similar to the printer apparatus configured with an embedded Web server described in U.S. Pat. No. 5,956,487 to Venkatraman et al., assigned to the assignee of the present invention, the disclosure of which is incorporated by reference herein in its entirety.

Still referring to drawing FIG. 1, the embedded Web server 12 of one possible preferred embodiment of the present invention is preferably housed in printer 10 on a single microprocessor board (not shown), which includes a microprocessor 20 responsible for controlling all aspects of Web server 12. Thus, microprocessor 20 is configured to process communication protocols and executable programs associated with Web server 12 which are stored in ROM (not shown) and/or hard disk memory 24. In one preferred embodiment, Web server 12 uses microprocessor 20 and the ROM-stored protocols to exchange data with other devices/users on one or more of the networks via Hyper Text Transfer Protocol (HTTP) and Simple Mail Transfer Protocol (SMTP), although other protocols such as File Transfer Protocol (FTP), Simple Network Management Protocol (SNMP), and Gopher document protocol may also be supported. Web server 12 is further configured to send and receive HTML formatted files. In addition to being linked to a local area network (LAN) or wide area network (WAN), printer 10 may be linked directly to the Internet via network interface 16 and communication links 18 attached thereto.

Microprocessor 20 is preferably part of the existing circuitry associated with a conventional printer. As such, microprocessor 20 is preferably configured to perform some or all of the printer specific functions of printer 10, including control of printer specific hardware and software.

Microprocessor 20 is provided with memory 22 in the form of RAM 21 and/or hard disk memory 24, which may be associated with the print cache of printer 10, or which may be provided separately from the print cache. As used herein, printer memory designated for temporarily or permanently storing one or more print jobs on hard disk memory 24 or other data storage device in printer 10 is referred to as "job retention" 25. In some possible embodiments, printer memory may be designated for storage of one or more printer error messages and will be referred to herein as a printer error archive 27. In one embodiment, a percentage of memory 22 in printer 10 may be dedicated to Web server 12. Alternatively, Web server 12 may share the available memory 22 in printer 10 with the print cache. Typically, printer 10 will be equipped with a minimum of 64 megabytes of RAM 21, although less RAM 21 may be used in certain configurations.

Preferably, microprocessor 20 of printer 10 is configured to translate coded language received from printer drivers of networked workstations into a bit-mapped image format (raster image format), and to store the translated print files in high capacity memory storage (i.e., job retention 25). Thus, the resulting "RIP'ed" print jobs, representing graphical images of text or drawings along with associated print attributes, are stored in job retention 25 as "print ready files."

Printer 10 will preferably contain executable software programs stored on hard disk memory 24 related to the operation of Web server 12. Hard disk memory 24 may also contain printer specific software programs relating to the operation of printer specific hardware. Alternatively, a separate hard disk (not shown) may optionally be provided with the requisite software programs for printing.

An error detector 23 located within the printer 10 is monitors each step of the process of receiving, translating, storing and printing a print job. Preferably error detector 23 functions as microprocessor 20 follows a set of instructions program retained in memory 22 to check for errors at each step of the process of receiving, translating, storing and printing a print job. Alternatively, error detector 23 could be an additional processor, which is solely dedicated to the error detection function. It will be appreciated that any method or system known, now or in the future, to those skilled in the art may be used to detect the errors from which error messages are generated. All such methods and systems are included within the scope of the present invention. Examples of some possible error detectors, among others that may be used in the present invention, are disclosed in U.S. Pat. No. 5,620,264, issued Apr. 15, 1997 to Kagita, and U.S. Pat. No. 5,625,757, issued Apr. 29, 1997 to Kageyama et al., each of which is incorporated herein by reference.

It is preferred that the error detector 23 generate a stack trace for each error detected. The stack trace is a record that may be stored in memory 22, preferably as part of a printer error archive 27. As a print job is performed, the instructions for performing that print job contained in the software, or firmware, controlling the printer are followed. This software may be expressed as a number of lines of code, each of which contains a statement or command for the printer to follow. Each line may be identified by an address identifying it by code number and line number, preferably this is expressed as a hexadecimal address. As each print job is performed, a program counter counts the lines of code that are utilized by the microprocessor 20. The stack trace contains at least the address of the line of code that was executed at the time of the error. More preferably, it contains a history of the addresses of code lines performed in attempting to execute that print job, as well as other information such as the details of the print job, up to and including a copy of the print job itself. Errors may also be identified by a class to which an error code is assigned. It will be appreciated that the printer error archive 27 thus stores and provides a great deal of information on printer errors occurring with printer 10. Printer error archive 27 thus constitutes an improvement over the traditional error logs known in the art.

Mechanical components 28 of printer 10 are the mechanisms, which are used to handle paper and print documents. Mechanical components 28 may include the paper feeding mechanism, the inkjets of an inkjet printer, the laser scanning assembly and revolving drum and other associated mechanisms of a laser printer, or other printing mechanisms known, now or in the future, to those skilled in the art.

Figure 2:
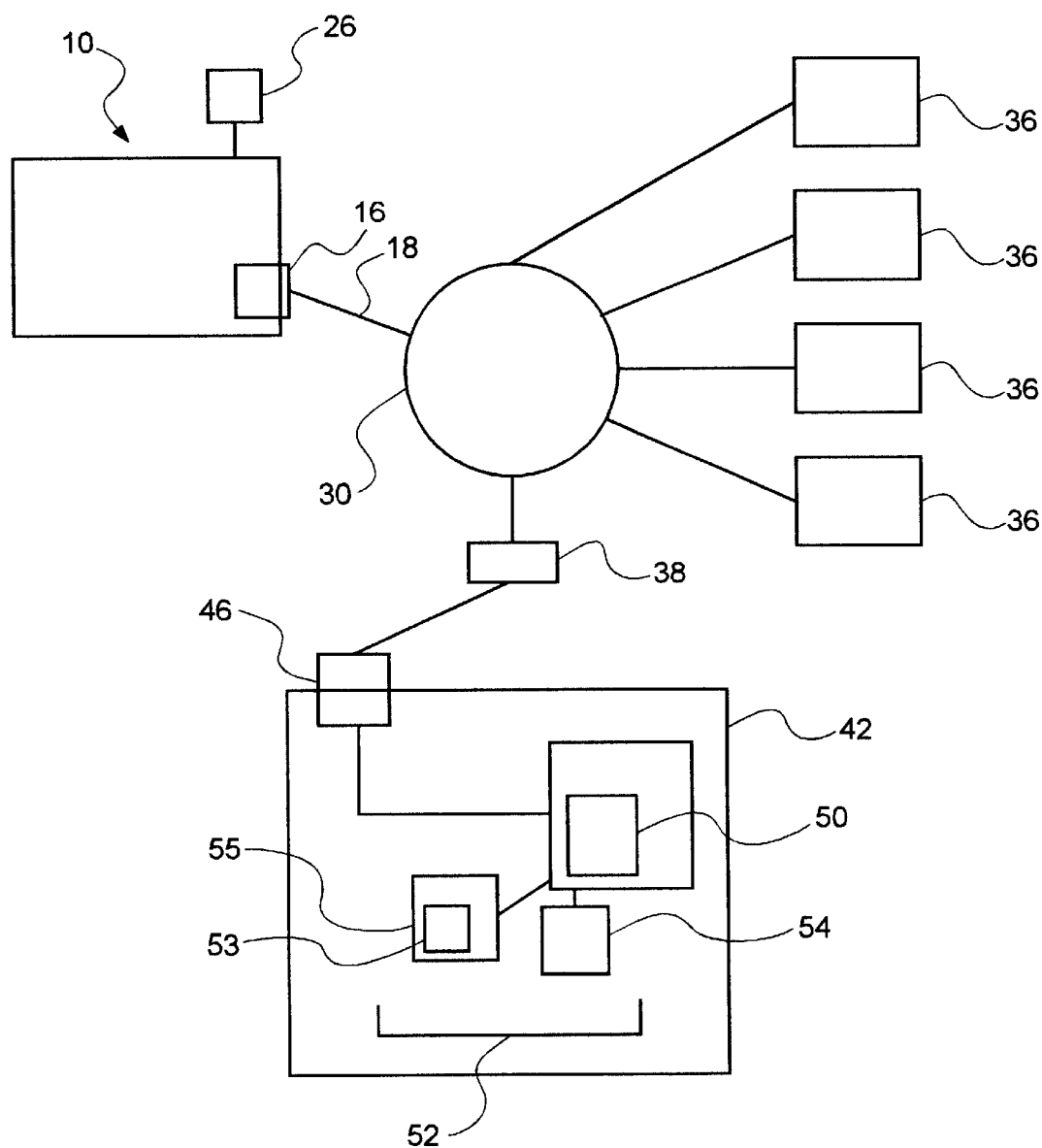
FIG. 2 illustrates a system of network components used in the methods and system of the present invention.

Referring now to drawing FIG. 2, printer 10 is shown as connected to a local computer network 30 to which are connected a number of computer workstations 36. Printer 10 is able to accept print jobs from each workstation 36 through network operative connections as known to those skilled in the art. Local computer network 30 also includes a gateway 38, which will typically comprise a software and/or hardware firewall. Gateway 38 functions to block various external data transmissions from being sent to locations residing inside local computer network 30. In this regard, gateway 38 may be restrictively configured to allow remotely situated users to access web pages within local computer network 30 (e.g., via HTTP protocols), and to block all other access. Gateway 38 also provides a port for outgoing Internet traffic. Gateway 38 is further preferably configured to internally route IP-Packets sent from workstations 36 to other web-based devices (e.g., printer 10) also residing within local computer network 30, and vice versa.

An external computer 42 includes an I/O interface 46 that allows connections to be made to a computer network, including an Internet or other connection, similar to network interface 16 discussed above. External computer 42 includes a microprocessor 50, which is provided with a memory 52. Memory 52 preferably includes RAM 54 and hard disk 55. Memory 52 may also include any other data storage devices or systems, which are useful in practicing the present invention. External computer 42, preferably also includes input and output peripherals allowing user commands to be given an executed. Microprocessor 50 is configured to maintain a set of information on printer errors, process data received through the I/O interface 46.

The information on printer errors is maintained in memory 52, preferably as a database 53. This information is preferably accessible by workstation 36 utilizing a web browser program to download data over a network, including the Internet. Preferably, the information is organized by each type of printer error message that may be generated by error detector 23. This may be done by arranging the information in the database 53 by stack trace, by a line code address associated with the error, by an error class code, or in any other suitable fashion. The information preferably consists of an explanation of the printer error, including a description of the causes of the error; and recommendations for correcting the error, reducing the recurrence of the error, or otherwise ameliorating the error. These recommendations can include instructions for making physical adjustments to the printer, from clearing a paper jam or inserting a new toner or ink cartridge to removing the printer motherboard and resetting switches thereon. Recommendations can further include the installation of available printer upgrades including software patches for drivers and newer versions of drivers among others, the installation of available upgrades to printer firmware, or the installation of upgraded printer associated hardware to the printer 10 or the local computer network 30. Where possible, available upgrades may be stored in the memory 52 for downloading by those accessing the information. The information may further include the actions that users have taken in response to the same or similar errors; including installation of upgrades, replacement of printer mechanical components 28, calling service technicians, etc.

The information on printer errors is preferably regularly updated. This may be accomplished by entering such information into the database 53 as it is developed by a manufacturer or printer service provider. For example, if a new printer driver, or a software patch to a printer driver, is developed that ameliorates a certain error, the database 53 may be updated to provide this additional information. External computer 42 may also be programmed to track the actions taken by users in response to printer errors for which more information is sought. Where the external computer 42 is so configured, common responses to each error, or error type, may be retained in the database 53 as additional information. The most common responses may thus be reported to users requesting additional information.

Figure 3:
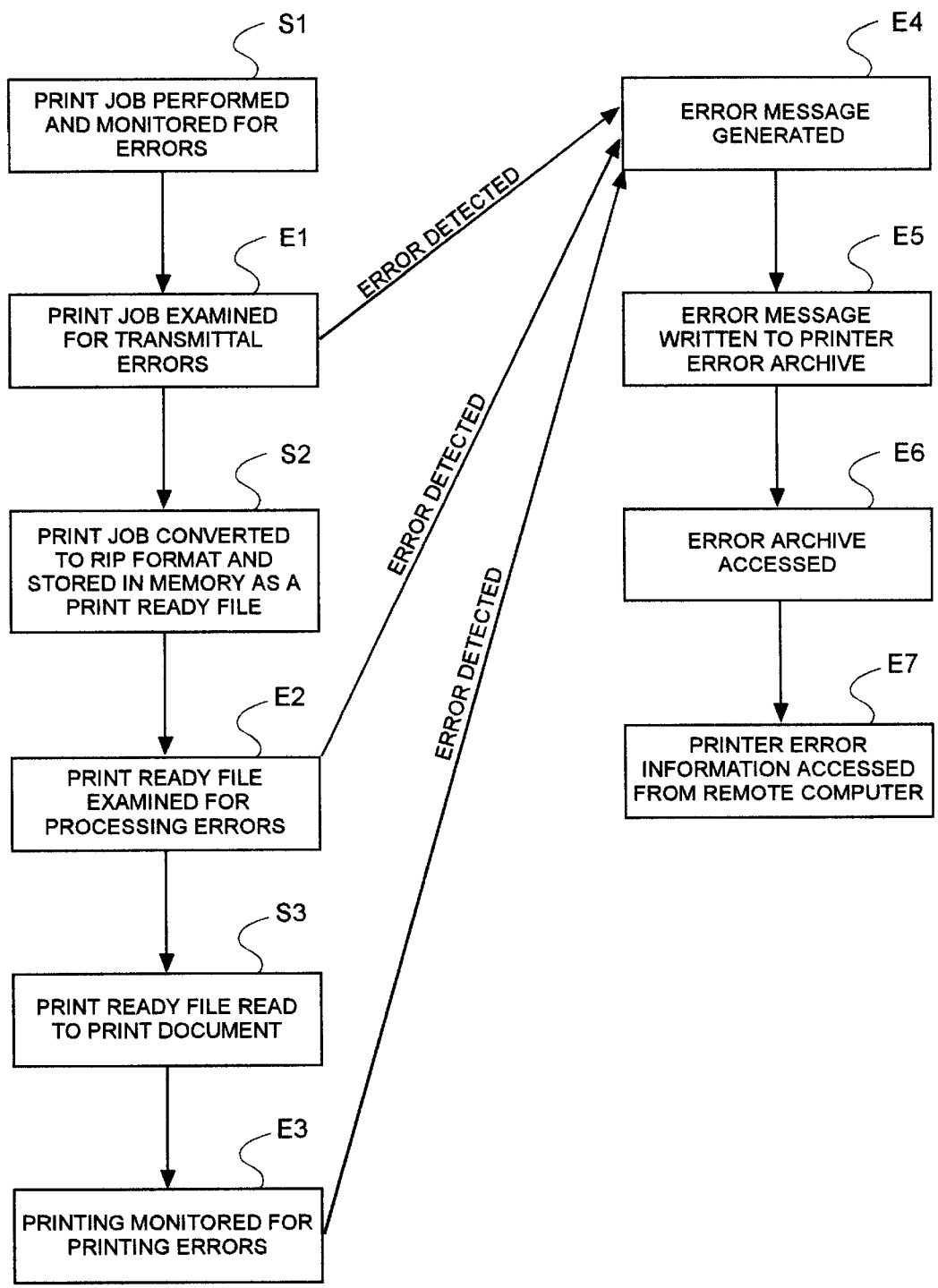
FIG. 3 is a flowchart showing a process of detecting printer errors, generating printer error messages, and accessing information on a remote computer to suggest upgrades or other action that may be taken to prevent or lessen the recurrence of the error.

Turning to FIG. 3, one possible embodiment of a process for detecting printer errors and accessing additional information thereon is described. For illustrative purposes, this process will be discussed as it would take place in connection with the embodiment of FIGS. 1 and 2, but it will be appreciated that the process may be used on any suitable system. It will be further appreciated that the process of FIG. 3 is illustrative only and does not limit the scope of the present invention. Processes similar to that depicted in FIG. 3 for providing additional information on printer errors may be practiced in accordance with the principles of the present invention and all such processes are within the scope of the present invention.

As shown in box S1, printer 10 receives a print job, this print job may either be sent, as a data transmission by a workstation 36, or downloaded directly from a print buffer by the printer 10. In the embodiments of FIGS. 1 and 2 this print job is received through the network interface 16. Preferably the print job is a data transmission in PDL or another PCL format, although any suitable format may be used. An error detector 23, preferably a series of instructions executed by microprocessor 20, then examines the print job for errors, as shown in box E1. If no errors are detected, the print job is converted into RIP format, preferably by a series of instructions executed by the microprocessor 20 and stored in the job retention 25 as a print ready file, as shown in box S2. The error detector 23 examines the print ready file for errors, either during conversion or prior to storage, represented in box E2.

If no errors are detected in the print ready file, the printer 10 uses the print ready file to control the mechanical components 28 through the printing steps to generate a printed document, as depicted in box S3. Preferably, a series of instructions executed by microprocessor 20 are used to read the print ready file and control the mechanical components 28 accordingly. The error detector 23 monitors the mechanical components 28 through the printing steps to determine if an error occurs, as shown in box E3.

If error detector 23 detects an error at any of the error detecting steps, an error message is generated as shown in box E4. The error message may be generated by the error detector 23, or by the Web server 12. In some preferred embodiments, the error message is then written into the printer error archive 27 that is kept in the memory 22 of the printer 10. As discussed above, the error message contains information to identify the type of error that has occurred. This may be accomplished by including a stack trace identifying the code line in execution at the time the error occurred, a stack trace detailing the history of the code lines performed by the printer 10 with respect to that print job, an error code assigned to that error or to a class of errors of a similar type, or any other such suitable identifying information.

Preferably, the error message is then written into the printer error archive 27 and retained in the memory 22 of the printer 10, as depicted in box E5. The printer error archive 27 may be accessed and searched to reveal the history of printer errors for that printer. The printer error archive 27 thus allows a history of printer errors to be displayed and examined, aiding in the diagnosis and repair of the printer 10.

Following an error, a user examines the printer error message on a display. Preferably, this is performed on a workstation 36, although it may also be done on the local display 26, or using a display on another web-enabled device. In one preferred embodiment, the user accesses the printer error archive 27, as shown in box E6. If necessary, due to the error, the printer 10 may need to be rebooted, or restarted, prior to accessing the printer error archive 27. It is preferred that the printer error archive 27, be accessed by accessing a printer control panel display on the workstation 36 and executing a command in the control panel to display the printer error archive 27. It will be appreciated, however, that the error archive may instead be accessed on a local display 26 attached to the printer 10, through another program, or in any other suitable manner known to those skilled in the art. It is preferred that the error message, when displayed, provides basic information on the printer error similar to those provided in a traditional error log; such as whether the printer is experiencing a physical problem (i.e. a paper jam), a lack of memory, or a problem with the software or firmware, or a basic error code.

Web server 12 uses microprocessor 20 to assemble a web page that is displayed to view a listing of the printer error archive 27. At least the most recent error message, and preferably all error messages, in the printer error archive 27 can be accessed by executing a command in the displayed web page. Execution of the command provides additional information on that printer error, as shown in box E7. It is preferred the command consist of an HTML button that may be selected in the display. It will be appreciated that alternative methods of making additional information on printer errors may be used and fall within the scope of the present invention. For example, rather than writing the error message to the printer error archive 27, the error message could instead be conveyed to a network administrator, or other user, as an email, or other network, message containing HTML buttons allowing the additional information to be selected.

When the additional information is selected, it is obtained from the database 53 contained in external computer 42. Preferably, Web server 12 is used to convert the request into an appropriate format, such as an HTML file or an email message. Web server 12 then conveys the request, in appropriate format, as one or more data packages (in accordance with a transfer protocol such as IP or TCP) to the network address of external computer 42. In an embodiment, such as that depicted in FIG. 3, this requires the data packets to be conveyed through network interface 16 and local computer network 30, over the Internet to I/O network interface 46 of external computer 42. External computer 42, which is preferably a network server, receives and assembles the data packet into the request. The request contains information identifying the printer error. This information may include the stack trace of the error, an error identification code, the hardware or firmware component involved in the error, or any other suitable identifying information.

Once external computer 42 receives and assembles the request for additional information it uses the error identifying information to assemble additional information on the printer error. This may be done by assembling the information in the database 53 associated with the stack trace, error identifying code, or other identifying information. The additional information is then conveyed back in response to the request, in a fashion similar to the conveyance of the request described above. It is preferred that external computer 42 keep an online error database of the printer errors for which additional information is requested. This allows the printer manufacturer, or other service provider to keep track of what errors are commonly occurring with the printers 10 in actual use, for which additional information is sought. Further upgrades, or other additional information may be created and provided based upon information provided to the online error database. It is preferred that the additional information be conveyed to the network address of printer 10 that conveyed the request, although it is within the scope of the present invention to convey the additional information to another network address, allowing a user to access the additional information from a device corresponding to that address. It is understood that external computer 42 may receive and respond to request for additional information from any number of printers 10, over the local computer networks 30 to which those printers 10 are attached, including the Internet.

Once the additional information is received and assembled, preferably by Web server 12, using microprocessor 20, the additional information is then preferably displayed in the web browser, as a web page in HTML format or otherwise, allowing it to be viewed by a user. This may involve the additional step of conveying the web page to a workstation 36 over the local computer network 30.

The additional information may include information on an upgrade to the printer software or firmware that may be installed to prevent or lessen the recurrence of the error. Where such an upgrade is available, it is preferred that the additional information include instructions on obtaining and installing the upgrade. It is more preferred that when the additional information is displayed to a user, the web page or other display include a command that may be executed to install that upgrade. This command may be a HTML button in a web browser display, or it may be any other suitable command. Once the user activates the command the upgrade will be installed. Alternatively, the system may be set to install the upgrade unless the user activates a command declining the installation. The upgrade may then be downloaded and installed over the local computer network 30 and Internet, from the external computer 42, or another remote computer.

Alternatively, if an upgrade is available, the upgrade itself may be conveyed to the printer 10 along with the other additional information. The upgrade may then automatically installed. This allows the printer 10 to install upgrades to ameliorate errors when further information in those errors is requested. By removing the need for the user to activate the installation, printer efficiency may be further improved.

It is preferred that the database 53 contain data on the actions computer users take with respect to the printer errors for which the additional information is provided. One method of collecting such data is to provide a command, or a series of commands in the additional information allowing the user to report what action is taken in response to the error and the additional information. This command may include a series of HTML buttons, a box for the input of text, or any other suitable reporting means. The data is then conveyed back over the network to the external computer 42, or to another suitable network address where a computer for receiving, processing and analyzing the reporting data resides.

Accordingly, the present invention includes a method of improving printer productivity, comprising providing a printer including an error detector for detecting errors in printing functions; attaching the printer in operative communication with a network; providing a computer containing a database of information on printer errors in communication with the network; performing a print job with the printer; examining the print job for errors with the error detector; when an error is found, creating an error message containing identifying information regarding the error; writing the error message into an error archive; accessing the error archive to display the error message; requesting additional information on the error through the error message; accessing the additional information from the computer in response to the request, allowing action to be taken in response to the error based upon the additional information.

It is preferred that the error archive be accessed through a printer control program display on a workstation in communication with the network, and then a command be entered to display the error archive. Preferably, this displays the contents of the error message on a display. Preferably, requesting additional information on the printer error is accomplished by executing a command to download the additional information from the computer. This may be done by activating an HTML link associated with the error message, displaying the additional information in a web browser program. The additional information preferably includes one or more upgrades to the printer to reduce the recurrence of the error. These upgrades may be installed by activating a HTML button displayed in the web browser as part of the additional information.

The present invention further includes a method of providing updated information on printer errors, comprising providing a printer that includes an error detector for detecting errors in performing a print job in communication with a workstation, using the workstation to convey a print job to the printer; performing the print job on the printer while examining the performance for errors; when an error is detected, using the printer to generate an error message including an access command to obtain additional information on the error; accessing that error message on the workstation; and executing that access command to download additional information from a remote computer over a network.

It is preferred that where the additional information includes information on an upgrade that may be installed to lessen the recurrence of said error, the additional information also include an installation command allowing that upgrade to be downloaded and installed. The installation command may be an HTML button that is displayed in a web browser displaying the additional information. It is preferred for the user to execute such installation commands. Preferably, the error message is retained in an error archive in the printer memory. Where this is done, accessing the error message on the workstation may be done by reading the error message from the printer memory and displaying it on a display attached to the workstation. This may use a web browser running on the workstation. The access command may be a HTML button selectable in the web browser.

The present invention also includes a method of providing additional information on printer errors, comprising attaching a computer containing a database of information on printer errors in communication with a network; and providing additional information on a printer error from the database to a workstation over the network, in response to a command executed by the workstation in an error message generated by a printer in communication with the workstation. It is preferred that the error message be displayed on a display attached to the workstation. Preferably, the computer will examine a stack trace located in the error message and provide additional information associated with that stack trace.

It is further preferred that the database be updated as new upgrades become available that may address printer errors. The computer may collect information on the printer errors by tracking the accessing of additional information and by tracking actions taken in response to the additional information. Collected information may be provided as part of the additional information.

The present invention thus advantageously provides methods and systems of providing additional updated information in response to actual printer errors. Use of the present invention is particularly advantageous for providing information on current ameliorative upgrade packages that may be installed to reduce the number of errors occurring on existing printers.

It will be appreciated by those skilled in the art that illustrated embodiments herein described are not intended to limit the invention or the scope of the appended claims. Various combinations and modifications of the preferred embodiments could be made without departing from the scope of the present invention and all such modifications are within the scope of the present invention. For example, it is understood that while the methods and apparatus of the present invention have been described in relation to a workstation interacting with a printer, one of skill in the art will recognize that the present invention may be utilized with a wide variety of networked and/or Web-based devices.

Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A method of improving printer productivity, comprising:
    providing a printer comprising an error detector for detecting errors in printing functions;
    attaching said printer in communication with a network;
    providing at least one remote computer in communication with said network, said at least one remote computer having a memory containing a database of printer error information in a memory configured to update said database error information using information supplied over said network to said memory of said at least one remote computer;
    performing a print job with said printer;
    examining said print job with said error detector for said errors;
    creating an error message where said examining reveals an error, said error message containing identifying information regarding said error;
    writing said error message into an error archive retained in said memory on said computer;
    accessing said error archive to display said error message;
    requesting additional information on said error message; and
    accessing said additional information on said printer error from said at least one remote computer in response to said request, allowing action to be taken in response to said error based upon said additional information to improve printer productivity using said information supplied over said network to said memory of said at least one remote computer.

2. The method of claim 1, where accessing said error archive includes accessing a printer control program display on a workstation in communication with said network and entering a command to display said error archive.

3. The method of claim 2, further comprising displaying contents of said error message on a display.

4. The method of claim 1, where requesting additional information on said error message comprises executing a command to download information from said at least one remote computer.

5. The method of claim 4, where executing said command includes activating an HTML link associated with said error message to display said additional information in a web browser program.

6. The method of claim 5, where said additional information includes a software upgrade to lessen the recurrence of said printer error.

7. The method of claim 6, where said software upgrade may be installed by activating a HTML button displayed in said web browser program as part of said additional information.

8. A method of providing updated information on printer errors, comprising:
    providing a printer in operative communication with a workstation, said printer including an error detector for detecting errors in performing a print job;
    conveying a print job to said printer by said workstation;
    performing said print job on said printer such that said performance is examined for errors by said error detector;
    generating an error message with said printer where said error is detected, said error message including an access command that may be executed to obtain additional information on said error from a remote computer accessible over a network, said computer having a memory configured to update a database of said updated information on printer errors contained therein using updated information supplied over said network;
    accessing said error message on said workstation; and
    executing said access command to obtain said additional information on said workstation by downloading said additional information from said remote computer over said network.

9. The method of claim 8, where said additional information includes information on an upgrade that may be installed to lessen a recurrence of said error.

10. The method of claim 9, where said additional information includes an installation command that may be executed to install said upgrade.

11. The method of claim 10, where said installation command is an HTML button that may be selected in a browser on said workstation.

12. The method of claim 10, further comprising executing said installation command to install said upgrade.

13. The method of claim 8, further comprising retaining said error message in an error archive stored in a memory on said printer.

14. The method of claim 13, where the act of accessing said error message on said workstation comprises reading said error message from said memory on said printer and displaying said error message on a display attached to said workstation.

15. The method of claim 14, where said error message is displayed in a web browser program running on said workstation.

16. The method of claim 8, where said access command is an HTML button that may be selected in a browser on said workstation.

17. A method of providing additional information on printer errors, comprising:
    attaching a computer containing a database of information on printer errors in communication with a network, said database accessible over said network, said computer having said database of information on printer errors in a memory contained therein configured to update said database of information of printer errors using information supplied over said network; and
    providing additional information on a printer error from said database to a workstation over said network, in response to a command executed by said workstation in an error message generated by a printer in communication with said workstation and displayed on said workstation.

18. The method of claim 17, where said computer provides said additional information by examining a stack trace located in said error message and providing information associated with said stack trace.

19. The method of claim 17, further comprising updating said database as new upgrades become available to address printer errors.

20. The method of claim 17, further comprising said computer collecting information on printer errors from said accessing in response to said error messages and actions taken in response to said errors.

21. The method of claim 20, where providing additional information comprises providing information on actions taken in response to similar errors.

22. A system for providing information on specific printer errors, comprising:

- a printer incorporating a Web server, said Web server linked to a network, said printer comprising a error detector for detecting errors in printing functions, said Web server configured to assemble and convey a request for additional information on said errors detected by said error detector;
- at least one receiving computer in communication with said network, said at least one receiving computer having a memory thereon, said memory configured to update said specific information on printer errors contained therein using specific information on printer errors supplied over said network; and
- at least one error information database stored within said memory of said at least one receiving computer, said at least one error information database capable of receiving a request for additional error information generated by said printer and conveyed over said network using specific information on printer errors supplied over said network to said memory contained therein.

23. The system of claim 22, further comprising at least one workstation in communication with said network, said at least one workstation capable of originating a print job, which may be conveyed to said printer over said network.

* * * * *